(12) United States Patent
Mack et al.

(10) Patent No.: US 7,094,325 B2
(45) Date of Patent: Aug. 22, 2006

(54) EDI AND RELATED STACKS AND METHOD AND APPARATUS FOR PREPARING SUCH

(75) Inventors: Bernard R. Mack, Natick, MA (US);
Keith J. Sims, Wayland, MA (US);
William W. Carson, Hopkinton, MA (US); Richard I. Parent, Waltham, MA (US)

(73) Assignee: Ionics, Incorporated, Watertown, MA (US)

( * ) Notice: Subject to any disclaimer, the term of this patent is extended or adjusted under 35 U.S.C. 154(b) by 592 days.

(21) Appl. No.: 10/356,043

(22) Filed: Jan. 31, 2003

(65) Prior Publication Data

US 2003/0146090 A1   Aug. 7, 2003

Related U.S. Application Data

(60) Provisional application No. 60/354,246, filed on Feb. 2, 2002.

(51) Int. Cl.
*B01D 61/42* (2006.01)
(52) U.S. Cl. .............. 204/524; 204/533; 204/536; 204/632; 204/633; 210/189; 210/675
(58) Field of Classification Search ............... 204/524, 204/533, 536, 632, 633; 210/189, 675
See application file for complete search history.

(56) References Cited

U.S. PATENT DOCUMENTS

| 2,057,232 A | 10/1936 | Endell |
|---|---|---|
| 2,411,238 A | 11/1946 | Zender |
| 2,689,826 A | 9/1954 | Kollsman |
| 2,788,319 A | 4/1957 | Pearson |
| 2,794,777 A | 6/1957 | Pearson |
| 2,812,300 A | 11/1957 | Pearson |
| 2,815,320 A | 12/1957 | Kollsman |
| 2,825,666 A | 3/1958 | Stoddard |
| 2,854,394 A | 9/1958 | Kollsman |
| 2,894,894 A | 7/1959 | Kressman et al. |
| 2,906,685 A | 9/1959 | Stoddard et al. |
| 2,912,372 A | 11/1959 | Stoddard |
| 2,923,674 A | 2/1960 | Kressman |
| 2,938,849 A | 5/1960 | Stoddard |
| 2,980,598 A | 4/1961 | Stoddard |
| 3,014,855 A | 12/1961 | Kressman |
| 3,074,863 A | 1/1963 | Jasionowski |
| 3,074,864 A | 1/1963 | Gaysowski |
| 3,084,120 A * | 4/1963 | Cecil et al. ............... 210/676 |

(Continued)

*Primary Examiner*—Arun S. Phasge
(74) *Attorney, Agent, or Firm*—David Silverstein; Andover-IP-Law

(57) ABSTRACT

Apparatus and method are disclosed for introducing ion exchange or other particulates into compartments of an already-assembled electrodeionization or comparable stack by modulating a flow of slurry into the compartments with slugs of gas such as air. The air propels liquid through the cells, scavenging ponded liquid so that the particulates (which are retained, e.g., by a strainer or obstruction, in compartment of the apparatus) are deposited as well-packed beds to fill the compartments. Pressurized air filling protocols may deliver discrete slugs of slurry between bursts of air, and the direction of filling may be periodically reversed to diminish particle bed non-homogeneities or settling gradients that arise during transport. The slugs of air may be applied in the direction of slurry flow, in the reverse direction, or both. Different slurries may be transported in a sequence to form layered and packed beds of enhanced utility. An apparatus of the invention has filled compartments of enhanced packing, and is ported or has its passages arranged so that ion exchange material may be filled, or may be replenished by a fluidized flow according to a method of this invention.

32 Claims, 4 Drawing Sheets

U.S. PATENT DOCUMENTS

| | | |
|---|---|---|
| 3,149,061 A | 9/1964 | Parsi |
| 3,251,764 A | 5/1966 | Miller et al. |
| 3,291,713 A | 12/1966 | Parsi |
| 3,330,750 A | 7/1967 | McRae et al. |
| 3,493,488 A | 2/1970 | Sisk |
| 3,515,664 A | 6/1970 | Johnson et al. |
| 3,562,139 A | 2/1971 | Leitz |
| 3,645,884 A | 2/1972 | Gilliland |
| 3,686,089 A | 8/1972 | Korngold et al. |
| 3,704,218 A | 11/1972 | Kato et al. |
| 3,705,846 A | 12/1972 | Kato et al. |
| 3,869,376 A | 3/1975 | Tejeda |
| 3,893,901 A | 7/1975 | Tejeda |
| 3,896,015 A | 7/1975 | McRae |
| 3,993,517 A | 11/1976 | Schneider |
| 4,032,452 A | 6/1977 | Davis |
| 4,033,850 A | 7/1977 | Kedem et al. |
| 4,148,708 A | 4/1979 | Grant |
| 4,165,273 A | 8/1979 | Azarov et al. |
| 4,284,492 A | 8/1981 | Karn |
| 4,298,442 A | 11/1981 | Giuffrida |
| 4,465,573 A | 8/1984 | O'Hare |
| 4,632,745 A | 12/1986 | Giuffrida et al. |
| 4,636,296 A | 1/1987 | Kunz |
| 4,687,561 A | 8/1987 | Kunz |
| 4,747,929 A | 5/1988 | Siu et al. |
| 4,804,451 A | 2/1989 | Palmer |
| 4,871,431 A | 10/1989 | Parsi |
| 4,925,541 A | 5/1990 | Giuffrida et al. |
| 4,931,160 A | 6/1990 | Giuffrida |
| 4,956,071 A | 9/1990 | Giuffrida et al. |
| 4,969,983 A | 11/1990 | Parsi |
| 5,026,465 A | 6/1991 | Katz et al. |
| 5,066,375 A | 11/1991 | Parsi et al. |
| 5,116,509 A | 5/1992 | White |
| 5,120,416 A * | 6/1992 | Parsi et al. .................. 204/536 |
| 5,203,976 A | 4/1993 | Parsi et al. |
| 5,259,936 A | 11/1993 | Ganzi |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,376,253 A | 12/1994 | Rychen et al. |
| 5,425,866 A | 6/1995 | Sugo et al. |
| 5,451,309 A | 9/1995 | Bell |
| 5,503,729 A | 4/1996 | Elyanow et al. |
| 5,512,173 A | 4/1996 | Uchino et al. |
| 5,558,753 A | 9/1996 | Gallagher et al. |
| 5,593,563 A | 1/1997 | Denoncourt et al. |
| 5,679,228 A | 10/1997 | Elyanow et al. |
| 5,679,229 A | 10/1997 | Goldstein et al. |
| 5,681,438 A | 10/1997 | Proulx |
| 5,736,023 A | 4/1998 | Gallagher et al. |
| 5,738,775 A | 4/1998 | Nagai et al. |
| 5,759,373 A | 6/1998 | Terada et al. |
| 5,762,774 A | 6/1998 | Tessier |
| 5,858,191 A | 1/1999 | DiMascio et al. |
| 5,868,915 A | 2/1999 | Ganzi et al. |
| 5,944,972 A | 8/1999 | Toda et al. |
| 5,961,805 A | 10/1999 | Terada et al. |
| 6,056,878 A | 5/2000 | Tessier et al. |
| 6,149,788 A | 11/2000 | Tessier et al. |
| 6,187,162 B1 | 2/2001 | Mir |
| 6,241,866 B1 | 6/2001 | Mir |
| 6,241,867 B1 | 6/2001 | Mir |
| 6,254,753 B1 | 7/2001 | Mir |
| 6,296,751 B1 | 10/2001 | Mir |
| 6,365,023 B1 | 4/2002 | De Los Reyes et al. |

* cited by examiner

EDI AND RELATED STACKS AND METHOD AND APPARATUS FOR PREPARING SUCH

This application claim benefit of 60/354,246 filed Feb. 2, 2002.

The invention relates to electrical transfer of electrolytes (including weakly dissociated electrolytes) from a first fluid to a second fluid, and more particularly relates to apparatus and processes utilizing the principle of electrodeionization (EDI, Filled Cell Electrodialysis, including Electrodiaresis). That is, the invention relates to electrodialysis and related apparatus and processes in which one or more compartments of the apparatus are filled at least in part with solid particulate ion exchange material and/or other particulates. In particular, it relates to methods of filling or re-filling such compartments and apparatus, and to apparatus having compartments so filled.

BACKGROUND OF THE INVENTION

Electrodeionization (EDI, Filled Cell Electrodialysis, including Electrodiaresis) is a process for transferring electrolytes (including weakly dissociated electrolytes) from a first fluid to a second fluid under influence of a substantially direct electric potential applied across compartments through which the first and second fluids pass. Generally, the first fluid passes through "dilute" or "diluting" compartments, where ions are removed from the fluid and migrate into adjacent "concentrate" or "concentrating" compartments containing the second fluid. At least some of the compartments, typically including at least some of the diluting compartments, are substantially filled or packed at least in part with ion exchange or other material, such as ion exchange resin beads, fibers, rods, felt or the like.

EDI is particularly attractive to deionize a first fluid such as water which has a low total dissolved solids content, and which exhibits low electrical conductivity that would yield a very high electrical resistance in a conventional electrodialysis arrangement. The use of conductive ion exchange packing in an EDI apparatus provides pathways for conduction of ions through fluid-filled cells and between ion exchange membranes defining walls of the various compartments. Packing also increases surface area available for removal of ions or ionizable matter carried in the first fluid, and constitutes a percolation medium that lengthens residence time of fluid in diluting compartments.

The concept of electrodialysis apparatus containing mixed bed ion exchange material in deionization compartments was apparently first disclosed by Kunin, et.al. ("Ion Exchange Resins", Wiley, N.Y. 1950, p 109) but no data were given. Chessmore (Master's Thesis, Chem. Eng. Dept., M.I.T., Cambridge, Mass. (1952)), and Walters, et.al. (Ind. Eng. Chem., 47, 61–67 (1955) and "Ion Exchange Technology", eds. Nachod and Schubert (Academic Press, New York, 1956) were apparently the first to disclose operating data. Other early disclosures were made by Glueckauf, et.al. (e.g., Second United Nations Conference on Peaceful Uses of Atomic Energy, Paper 308 (1958) and Brit. Chem. Eng., 4, 646–651(1959)). Kedem, et al., disclosed filled cell electrodialysis in which dilute compartments were filled with various knit ion exchange fibers (Desalination, 16, 105–118 (1975)), such cells being in the form of a tank having sealed concentrate compartments, open dilute compartments being filled with granular anion exchange resin "which can be poured in and pumped out" (Desalination 24, 313–319 (1978)). In the latter publication, it was suggested that the open dilute compartments may also contain knit cation exchange fibers against cation selective membranes. Flow of fluid through dilute compartments was by gravity, which limited the rate and compartment size to uneconomic values. Such apparatus had the advantage that it could be easily filled with particulate anion exchanger and such exchanger could be easily removed for cleaning or replacement. Concentrate compartments depended solely on electrical transfer of water through surrounding membranes. As a result concentrate was in fact very concentrated and was subject to scaling and precipitation of poorly soluble electrolytes. The same author(s) reported on similar electrodialysis stacks in which dilute chambers were filled solely with a net of multifilament anion exchange material (Desalination 46, 291–299 (1983)). Numerous papers since that time have addressed problems encountered in operation or improvements in construction or filling of EDI and related stacks.

There have been many patent publications concerning packed cell electrodialysis and related processes and apparatus including the following U.S. patents: U.S. Pat. Nos. 2,689,826; 2,815,320; 3,149,061; 3,291,713; 3,330,750; 3,515,664; 3,562,139; 3,686,089; 3,705,846; 3,993,517; 4,284,492; 4,632,745; 4,747,929; and 4,804,451, each of which is incorporated herein by reference. Nevertheless, although electrodialysis with packed cells (e.g., electrodeionization including electrodiaresis) has been known and studied for about 50 years, it has begun to receive widespread commercial use only in the last few years. Reasons for this slow development of commercially competitive EDI devices appear to involve many factors, such as:

a) The need to fill individual compartments in an EDI stack with ion exchange resin material, e.g. particulates such as resin beads, poses the need to keep such resin in place while assembling the stack, and there are practical difficulties in doing this, especially for relatively large stacks. This has typically required very careful hand assembly, or use of sealed layers or modular envelopes of ion exchange particulates, or other relatively costly steps during assembly process of the stack. These constructions, in turn, dictate complete disassembly or rebuilding when it is necessary to change ion exchange packing. Until recently practical external filling and removal of resin particulates has not been done because of lack of any EDI stack designed to be filled with resin particulates after the stack has been assembled; and lack of a process to fill and empty such an assembled stack (e.g., an effective way to move resin particulates into or out of a stack.)

b) Particulate ion-exchange packing is a very good filter medium. Resistance to flow of fluid through packing is increased by material filtered out during operation. In the case of conventional (chemically regenerated) ion exchange deionization, ion exchangers are periodically backwashed at flow rates which expand the volume of particulates, i.e. separating particulates slightly from each other allowing filtered material to escape. However, EDI apparatus typically employs relatively narrow flow passages for diluting and concentrating compartments, constraining flow and particle movement. Until recently such bed expansion capability has not been a feature of EDI apparatus. Instead EDI has been simply preceded by fine filtration to delay or prevent congestion of resin packing. The latter is nevertheless seldom completely effective.

c) Anion exchange particulates tend to sorb negatively charged colloids and medium molecular weight anions which occur naturally in water. Such sorbed materials (generally termed foulants) interfere with satisfactory operation of EDI apparatus, e.g. by increasing electrical resistance and decreasing rate of transport of ions into the interior of particulates. In an EDI process, electric current tends to drive such foulants into anion exchange particulates and thereby accelerate fouling. Until recently EDI stacks have in practice been preceded by scavenging type anion exchange resin and/or activated carbon columns to attempt to remove foulants before they can enter stacks. Such pretreatment is costly and seldom completely effective, especially in view of often unpredictable breakthroughs of foulants upon exhaustion of the resin and/or carbon pretreatment column.

d) Precipitates of sparingly soluble inorganic compounds (e.g., calcium carbonate, magnesium hydroxide, calcium sulfate) tend to form within particulate packing, in anion exchange membranes, or in concentrate compartments of EDI apparatus, when precursors of such compounds are present in fluid processed, because water splitting that continuously regenerates the resin also causes pH conditions that precipitate scale. Such problem does not exist in conventional ion exchange deionization in which anion- and cation-exchange particulates are separately regenerated with alkali and acid respectively. In conventional electrodialysis, build-up of such precipitates may be simply addressed largely by frequent, regular reversal of direct electric current, e.g., a few times per hour.

e) At water dissociating junctions between commercially available anion exchange bodies (e.g. membranes and particulates) and cation exchange bodies, quaternary ammonium moieties (the usual bound positively charged group in commercially available anion exchange bodies) are rapidly converted to tertiary amines and/or non-ionized groups, resulting in increased electrical resistance at such junctions and degradation of stack performance. Such conversion may be due to some combination of high alkalinity, high temperature, and high electric field in the junctions. There is not an equivalent phenomenon in conventional ion exchange deionization under normal process conditions. Thus, in the case of EDI until now it has been necessary after some months to a year or so to disassemble a packed stack and replace at least anion selective membranes and preferably also anion exchange particulates. Some EDI stacks are sealed (i.e. membranes and filled inter-membrane spacers are glued together) in which case it may be necessary to replace an entire stack, possibly with exception of screen-filled concentrate spacers.

f) Electrical resistance of packing depends also on area of contact of beads, hence on deformability of beads, on forces causing such deformation, on distribution of bead sizes and any time dependent relaxation of force, e.g., from cracking of beads. The overall effect is usually a time dependent increase in electrical resistance that may eventually require repair or replacement of a stack. A similar problem does not exist in conventional ion exchange deionization as there is no electric field.

g) Owing to the short distance between membranes in packed electrodialysis apparatus (e.g. about 0.3 centimeters) substantial channeling of processed fluids can occur resulting in less than expected performance.

Methods are taught in U.S. Pat. No. 5,066,375, No. 5,120,416, and No. 5,203,976 to fill stacks after they have been assembled, using a slurry of liquid (e.g., water) and ion exchange particles. These methods have to some extent mitigated one or more of the above deficiencies. Those patents are hereby incorporated herein by reference.

Nonetheless, there remains a need for methods and procedures for depositing an effective filling of particulates in cells of an assembled electrodeionization or related apparatus.

There is also a need for an electrodeionization apparatus that can be effectively filled with, or replenished with, ion exchange packing.

SUMMARY OF THE INVENTION

The invention improves upon previous methods by providing greater control over packing of resin beads or other particlulates in an assembled stack, and provides an electrodeionization or related apparatus of improved construction. The invention uses gas in combination with particulate and liquid slurry to deposit in an assembled stack a uniform bed of particulates (e.g., a homogeneously packed filling in cells of a stack). This may be a well-packed mixed bed, a single-property resin bed with cation resin only, or anion resin only, or a well packed bed having two or more well-defined bands or layers, each of single-property ion exchange particulates to fill cells with a suitable packing density.

In one embodiment, this invention relates to the preparation of elongated resin-filled flow cells preferably having a thickness of less than about two millimeters. In other embodiments, this invention relates to the preparation of such cells having a substantially uniform distribution of ion exchange resin, said cells either containing pockets or, in certain embodiments, being filled so as to be substantially without voids. Filled cells prepared in accordance with this invention may be designed for banded or layered cross direction of flow.

The invention uses a combination of gas and liquid to fill a substantially fully assembled EDI or related stack with particulates (e.g. ion exchange material) from the outside. This solves one or more of the above problems or provides one or more of the above mentioned benefits. The stack or stacks of this invention may utilize flat, planar membranes, dished membranes or spiral wound membranes.

A number of specific invention embobiments are enumerated below:

(1) In an apparatus embodiment in accordance with this invention, there is provided a filling apparatus for at least partially filling one or more cells of an electrodialysis, electrodeionization, electrodiaresis or a related stack assembly with particulates through one or more conduits communication with such cell(s), each cell having one or more inlets communicating with one or more inlets into the stack and one or more outlets communicating with one or more outlets from the stack, wherein such filling apparatus comprises:

(a) one or more suspension-creating assemblies effective to provide one or more suspensions of fluids and solid particulates without substantial loss of suspension of such particulates in such fluids;

(b) one or more suspension-moving assemblies comprising one or more suspension-delivery conduits operative to move the suspension(s) from the one or more suspending-creating assemblies along the suspension-delivery conduit(s) to the stack whereby particulates of the suspension(s) are substantially maintained in suspension while flowing in the suspension-delivery conduit(s) and the suspension(s) are thereby delivered to the stack substantially without loss of suspension for deposit of the particulates in cells of the stack; and, (c) a gas source connected to introduce gas into such suspension(s), or into the suspension-delivery conduits, or into both, whereby such suspension(s) are passed into and through the cell(s) such that particulates are retained in the cell(s) and liquid is forced out of the cell(s).

(2) A fluid for use in a filling apparatus as described in (1) above may consist essentially of a mixture of liquid and gas.

(3) In a specific apparatus embodiment, the fluid may consist essentially of water.

(4) In another specific apparatus embodiment, the fluid consists essentially of water and one or more entities selected from the group consisting of:
  (i) entities which cause particulate shrinkage;
  (ii) entities which modify gas/liquid interfacial tension or surface energy; and,
  (iii) entities which modify particulate/liquid interfacial tension or surface energy.

(5) Particulates for use in a filling apparatus as described in (1) above may consist essentially of ion exchange particulates.

(6) A gas source for use in a filling apparatus as described in (1) above may comprise a source of air.

(7) A gas source for use in a filling apparatus as described in (1) above is preferably capable of introducing gas at controlled variable rates.

(8) In another embodiment, a gas source for use in a filling apparatus as described in (1) above is preferably capable of introducing gas intennittently.

(9) In another embodiment, a filling apparatus in accordance with this invention comprises a control system operative to:
  (i) flow the suspension(s);
  (ii) stop flow of the suspension(s) and introduce sufficient gas from the gas source to drive liquid from the cell(s);
  (iii) iteratively to repeat steps (i) and (ii).

(10) In another embodiment of a filling apparatus in accordance with this invention, one or more of the suspension-creating assemblies provides two or more different suspensions selected from the group consisting of:
  (i) a suspension consisting essentially of cation exchange particulates;
  (ii) a suspension consisting essentially of anion exchange particulates;
  (iii) a suspension consisting essentially of cation exchange particulates and anion exchange particulates;
  (iv) a suspension consisting essentially of two groups of particulates, a first group of substantially uniform size particulates having a first mean particulate size and a second group of substantially uniform size particulates having a second mean particulate size which is different from said first mean particulate size; and,
  (v) a suspension consisting essentially of two groups of particulates, a first group of substantially uniform density particulates having a first mean particulate density and a second group of substantially uniform density particulates having a second mean particulate density which is different from said first mean particulate density.

(11) In a further embodiment of a filling apparatus as described in (10) above, there may further be provided a control assembly effective to alternatively deliver to the stack one or another of the different suspensions described in (10) above to form particulate layers in cells of the stack, such layers differing with respect to ion exchange functionality, mean particulate size, and/or mean particulate density.

(12) In a preferred embodiment, electrodialysis, electrodeionization, electrodiaresis or the related stack assembly for use in a filling apparatus as described in (1) above may comprise spiral wound membranes.

(13) In yet another embodiment, a filling apparatus in accordance with this invention further comprises one or more suspension-moving assemblies which are operative to deposit some of the particulates in the cell(s) and to return some of the particulates to the one or more suspension-creating assemblies.

(14) In a specific embodiment, substantially all of the particulates for use in a filling apparatus as described in (1) above may have substantially the same settling velocity.

(15) In a process embodiment in accordance with this invention, there is provided a process for at least partially filling one or more cells of a planar, dished or spiral wound electrodialysis, electrodeionization, electrodiaresis or related stack assembly with particulates through a suspension-delivery conduit system communicating with the stack assembly, wherein such process comprises the steps of:
  (a) creating one or more suspensions of fluid and solid particulates, and providing sufficient agitation to the suspensions substantially to maintain the particulates in suspension;
  (b) flowing the suspension(s) through thesuspension-delivery conduit system to the cell(s) of the stack assembly while continuing to maintain the particulates substantially in suspension;
  (c) introducing gas into the suspension-delivery conduit system during flow of the suspension(s) through the conduit system, intermittently while there is no flow of suspension(s) through the conduit system, or both; and,
  (d) flowing the suspension(s) from the suspension-delivery conduit system into the cell(s), depositing the particulates in the cell(s), and removing liquid from the cell(s).

(16) A fluid for use in a cell-filling process as described in (15) above may consist essentially of a mixture of liquid and gas.

(17) In a specific process embodiment in accordance with (15) above, the fluid may consist essentially of water.

(18) In another specific process embodiment, the suspension-delivery conduit system includes a gravity head.

(19) In still another process embodiment, the fluid consists essentially of water and one or more entities selected from the group consisting of:
  (i) entities which cause particulate shrinkage;
  (ii) entities which modify gas/liquid interfacial tension or surface energy; and,
  (iii) entities which modify particulate/liquid interfacial tension or surface energy.

(20) Particulates for use in a cell-filling process as described in (15) above may consist essentially of ion exchange material.

(21) A gas for use in a cell-filling process as described in (15) above may consist essentially of air.

(22) In another embodiment, a cell-filling process according to the present invention may further comprise the step of using a control system to:
  (i) flow the suspension(s) to the cell(s);
  (ii) periodically stop the flow of the suspension(s) and also introduce sufficient gas from a gas source to drive liquid from the cell(s);
  (iii) iteratively repeat steps (i) and (ii).

(23) In another embodiment, a cell-filling process according to the present invention may utilize suspensions consisting of two or more different suspensions selected from the group consisting of:
  (i) a suspension consisting essentially of cation exchange particulates;
  (ii) a suspension consisting essentially of anion exchange particulates;
  (iii) a suspension consisting essentially of cation exchange particulates and anion exchange particulates;

(iv) a suspension consisting essentially of two groups of particulates, a first group of substantially uniform size particulates having a first mean particulate size and a second group of substantially uniform size particulates having a second mean particulate size which is different from said first mean particulate size;

(v) a suspension consisting essentially of two groups of particulates, a first group of substantially uniform density particulates having a first mean particulate density and a second group of substantially uniform density particulates having a second mean particulate density which is different from said first mean particulate density; and, (vi) a suspension consisting essentially of two groups of particulates, a first group of substantially uniform particulates having a first mean terminal settling velocity and a second group of substantially uniform particulates having a second mean terminal settling velocity which is different from said first mean terminal settling velocity.

(24) In still another embodiment, a cell-filling process according to the present invention further comprises the step of alternatively delivering to the stack one or another of the different suspensions as described in (23) above to form particulate layers in cells of the stack, such layers differing with respect to ion exchange functionality, mean particle size, mean particulate density and/or mean terminal settling velocity.

(25) In still another embodiment, a cell-filling process according to the present invention further comprises the steps of depositing some of the particulates in the one or more cells and returning some of the particulates to step (a) of the process as described in (15) above.

(26) In a specific process embodiment according to the present invention, substantially all the particulates have substantially the same settling velocity.

(27) In accordance with another apparatus embodiment for at least partially filling one or more cells of an electrodialysis, electrodeionization or electrodialysis stack with ion exchange particulates through a conduit communicating with the stack, the stack comprising a plurality of cells and each cell being defined by opposed membranes and a spacer separating the membranes, each cell further having an inlet and an outlet, communicating with an inlet of the stack and an outlet of the stack, respectively, the apparatus includes at least the following elements:

a mixing assembly effective to provide a mixture of liquid and particulates, the particulates being suspended substantially without settling in the liquid, a fluid moving assembly operative to move the mixture from the mixing assembly along a conduit to the stack, and providing flow at a level sufficient to substantially prevent segregation of the particulates as they move in the conduit whereby the mixture is delivered to the stack substantially without settling or segregation, flowing through the stack and depositing the particulates in the cells, and a gas introducer connected to inject gas and form a gas-modulated flow of the mixture, such that liquid is propelled through the stack while depositing particulates retained in the cells, wherein the gas introduced scavenges any ponded liquid within the cells of the stack such that the particulates deposit as a better defined and/or more uniform bed of packing.

(28) In accordance with another method embodiment for at least partially filling one or more cells of an electrodialysis, electrodeionization or electrodialysis stack with ion exchange particulates, the stack comprising an inlet, and outlet and a plurality of cells, each cell being defined by opposed membranes and a spacer separating the membranes, each cell further having an inlet and an outlet communicating with the inlet of said stack and the outlet of said stack, respectively, the method includes at least the steps of:

providing a mixture of liquid and particulates, the particulates being suspended substantially without settling in the liquid, flowing the mixture into the stack at a rate of flow sufficient to substantially prevent segregation of the particulates such that the mixture is delivered to the stack substantially without settling or segregation, flowing through the stack and depositing the particulates in the cells, and injecting gas to form a gas-modulated flow of the mixture, such that liquid is propelled through the stack and particulates are deposited in each of the cells as a better defined and/or more uniform bed of packing.

(29) In accordance with still another method embodiment for filling compartments of the stack of an ion exchange apparatus with a desired ion exchange material, such method may comprise the steps of:

providing a flow of slurry including a minor proportion of the desired ion exchange material entrained therein, such flow passing into and through the stack such that the entrained ion exchange material is retained in the compartments, and providing slugs of gas under pressure to scavenge ponded liquid from the compartments, such that the flow of slurry proceeds unimpeded by ponded liquid to deposit the entrained ion exchange material as a packed bed.

(30) In accordance with another apparatus embodiment of the present invention, there is provided an ion exchange apparatus, including an electrodialysis, electrodeionization or electrodialysis stack and particulate ion exchange material, wherein the stack has an inlet, an outlet and a plurality of cells, each cell being defined by opposed membranes and a spacer separating the opposed membranes, each cell further having an inlet and an outlet communicating with the inlet of the stack and the outlet of the stack whereby fluid may be passed through the cells, at least some of such cells being filled cells which are filled with the particulate ion exchange material for conducting ions to or from an adjacent cell, wherein the filled cells include a retainer effective for catching particulates presented in a fluidized flow through such cells and retaining the particulates in each of these cells as a homogeneously packed bed.

(31) In accordance with still another apparatus embodiment of the present invention, apparatus is provided for at least partially filling one or more cells of an electrodialysis, electrodeionization and/or electrodiaresis stack with particulates through first conduit means communicating with the stack, each such cell being defined by two membranes and walls of a spacer, each such cell also having inlet means and outlet means in communication respectively with inlet means and outlet means of the stack, wherein the apparatus includes at least the following elements:

liquid holding means equipped with agitating means effective to agitate mixtures of liquid and such particulates so that the particulates remain substantially suspended in the liquid and do not settle substantially, pumping means having inlet means in communication with the liquid holding means through second conduit means, such pumping means providing flow sufficient to prevent substantial segregation of the particulates in the conduit means, the liquid holding means communicating seriatim with the second conduit means, the pumping means, the first conduit means, the inlet means of the stack, the inlet means of the cell, the cell, the outlet means of the cell, and the outlet means of the stack, third fluid conduit means communicating with the first conduit means and/or with the second conduit means thereby enabling introduction of gas to the first conduit means and/or the second conduit means.

(32) In accordance with another process embodiment for at least partially filling one or more cells of an electrodialysis, electrodeionization and/or electrodiaresis stack with particulates through first conduit means communicating with the stack, the process includes at least the following steps:

providing an electrodialysis, electrodeiomzation and/or electrodiaresis stack comprising one or more cells, each such cell defined by two membranes and walls of a spacer, each such cell having inlet means and outlet means in communication respectively with inlet means and outlet means of the stack, providing liquid holding means equipped with agitating means effective to agitate mixtures of liquid and such particulates so that such particulates remain substantially suspended in such liquid and do not settle substantially, providing pumping means having inlet means in communication with the liquid holding means through second conduit means, such pumping means effective to provide flow sufficient to prevent substantial segregation of the particulates in the conduit means, also providing means communicating seriatim from the liquid holding means through the second conduit means, the pumping means, the first conduit means, the inlet means of the stack, the inlet means of the cell, the cell, the outlet means of the cell, to the outlet means of the stack, further providing third fluid conduit means communicating with the first conduit means and/or the second conduit means thereby enabling introduction of gas to the first conduit means and/or the second conduit means, said process also comprising the steps of forming one or more mixtures of liquid and such particulates in the liquid holding means, passing at least part of such one or more mixtures seriatim from the liquid holding means through the second conduit means, the pumping means, the first conduit means, the inlet means of the stack, and the inlet means of the cell, said process further comprising the steps of introducing gas through the third fluid conduit means into the first and/or the second conduit means in predetermined amounts according to a predetermined program.

In a preferred embodiment, particulates are carried as a slurry or a suspension which is urged through one or more fluid conduits into cells of such assembly by a head provided, e.g., by a gravity leg, a pump and/or an eductor, while gas (e.g., air) is fed into the fluid conduits at a controlled rate or under a controlled regimen during the filling operation. Such gas preferably is fed as "slugs" or pulses that interrupt continuity of flowing slurry or suspension. This may be done while stopping flow of fluid slurry while injecting gas, or by otherwise arranging the relative provision of gas and slurry (e.g., by gate valves and flow segments) so that there are periods when substantially only gas travels along the conduit(s) under pressure. Equivalently, discrete periods while slurry is fed may considered as "slugs" of fluid/slurry separated by gas bodies. The gas slugs act as a propellant that not only maintains movement along a conduit, but that, inside a stack moves relatively freely through narrow compartments and particulates transported into such compartments, and scavenges, displaces or pushes any liquid phase out. This prevents fluid stagnation or "ponding" within cells of a stack during filling operation. Such liquid ponding in narrow spaces and channels of a stack would otherwise impair flow transport of particulates to and into beds of particulates, and would result in poorer packing and less than optimal performance of the assembly. Such gas propellant provides a system for flushing liquid from cells, e.g., liquid located above or in voids of a partially packed bed in such cells. Removal of such liquid provides better flow of slurry through any open (unpacked) portion of a cell and results in better defined or more uniform packing of a bed.

Slurry used for filling may vary in fluid and particulate characteristics, such as size, density, and/or composition during a stack filling procedure, according to any design of the packed bed length. Moreover, composition of fluid phase may be chosen to effect a physical change in particulate material; for example, entities such as salts or organics may be added to cause particulate shrinkage for more effective filling or transport. Similarly, when applied to empty and re-fill, or replenish a stack, such fluid may be used to condition particulates for a removal protocol. A slurry may be a two-phase slurry (e.g., liquid/particles) or a three-phase slurry (e.g., liquid/particles/air), in which air bubbles have been injected, or combinations thereof that vary over time. Such two- or three-phase slurries are generically referred to herein as "fluid slurries" or "suspensions". Provision of bubbles of air in a slurry can improve overall fluid transport properties by reducing fluid drag and enhancing ability of particulates to remain suspended.

BRIEF DESCRIPTION OF THE DRAWINGS

These and other features of the present invention will be understood from the description and claims herein, taken together with the drawings illustrating details and representative embodiments of the invention wherein:

DETAILED DESCRIPTION OF ILLUSTRATIVE EMBODIMENTS

Figure 1:
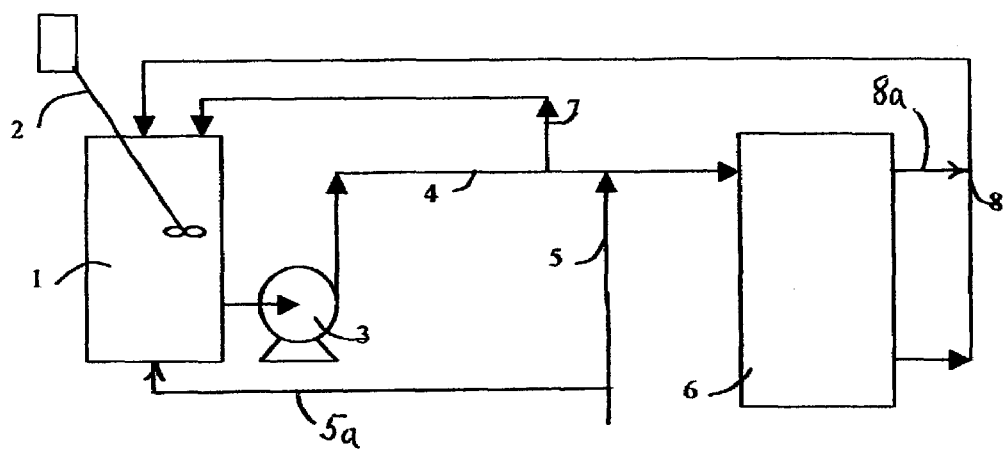
FIG. 1 is a simplified flow diagram schematically illustrating apparatus and method according to one embodiment of this invention for introducing ion exchange or other particulates into one or more compartments of an already-assembled electrodeionization stack or similar assembly.

A simplified flow diagram of one preferred embodiment of apparatus of the invention is shown in FIG. 1. Tank 1 is filled with liquid and agitated by Mixer 2 and/or gas. Particulate material is slowly added to Tank 1 to achieve a particulate concentration of between about 0.01 and about 10 percent by volume. This provides a fluid/particulate mixture or slurry for carrying out filling protocols described below. Fluid may be returned to Tank 1, and further particulates may be added over the time required to fill a stack so as to maintain a desired particulate concentration in a slurry. Preferably particulate concentration is maintained in the range of about 0.1 to about 3 percent by volume. Different particulates may be added at different times during filling to produce a packed bed with bands or layers across the width of the spacer which bands or layers have different resin compositions and properties. Particulate suspension or slurry passes from Tank 1 and is moved under pressure, e.g., by a pump or other suspension moving assembly 3, and passes by way of fluid conduit 4 to Stack 6 which is to be filled. Flow rate of liquid is maintained high enough to prevent loss of suspension of particulates, e.g., segregation, in fluid conduit 4. At the same time, pressurized gas from a source of gas (not shown) is added to fluid conduit 4 by way of fluid conduit 5. Volumetric ratio of gas to liquid in the fluid is maintained in a range of from about 2:1 to about 20:1 at the pressure present in fluid conduit 4. Preferably the volumetric ratio of gas to liquid in the fluid is maintained in the range from about 2.4:1 to about 10:1 at the pressure present in conduit 4. At least a portion of the gas, e.g., air, from such source of gas may also or instead be conveyed by conduit 5a to Tank 1 to stir or help stir the contents thereof and/or to form a three-phase fluid slurry of liquid, gas and solid particulates. Flow in conduit 4 passes into, and through Stack 6, and particulates are retained in cells of the stack by means of retainers (e.g. strainers) at outlets of cells. Remaining gas/liquid mixture exits Stack 6 and particulate-depleted liquid is preferably returned to Tank 1, e.g., by way of a return fluid conduit 8. Conduit 8 preferably enters Tank 1 at a level above the liquid level in Tank 1, so as not to dilute the mixed slurry abruptly. Bypass recirculation fluid conduit 7 may also be provided from conduit 4 into Tank 1, providing a loop that maintains a desired non-settling flow rate in such conduit 4. Part of such slurry in conduit 4 may pass through Stack 6 without passing through cells in such stack and be returned to Tank 1 via conduit 8a. Such internal bypass serves to prevent loss of suspension of particulates in internal manifolds in Stack 6.

Figure 2:
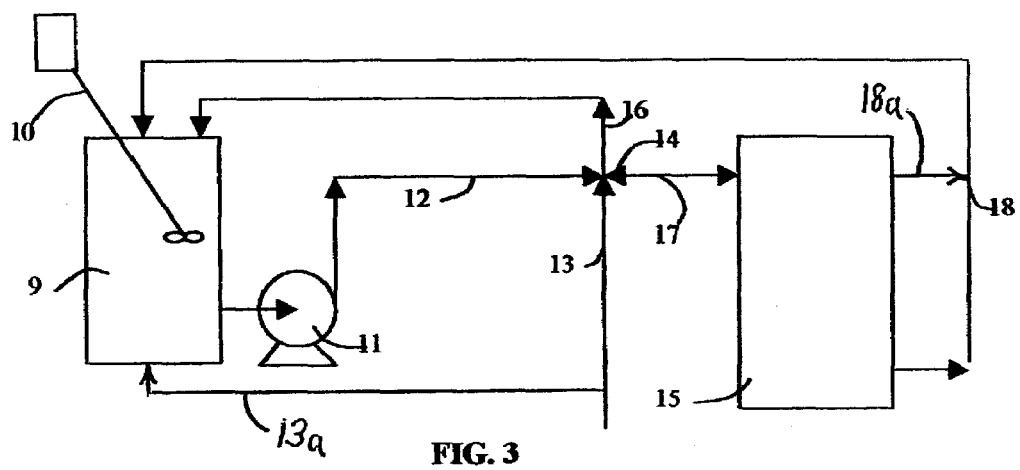
FIG. 2 is a simplified flow diagram schematically illustrating apparatus and method according to another embodiment of this invention.

Another preferred embodiment of apparatus of the invention is shown in FIG. 2. Tank 9 is filled with fluid, e.g., liquid or two-phase gas (such as air) and liquid, and is agitated by mixer 10. Particulate material is slowly added to Tank 9 over the time required to fill Stack 15 to maintain a particulate concentration between about 0.01 and about 10 percent by volume. Preferably particulate concentration is maintained in the range of from about 0.1 to about 3 percent by volume. Mixed particulate suspension or slurry is pressurized, e.g., by a pump 11, and passes by way of fluid conduit 12 to the Stack 15 that is to be filled, or is returned to Tank 9 by way of a valve assembly 14 and fluid bypass/return conduit 16. The flow rate of suspension is maintained high enough to prevent loss of suspension particulates, e.g., segregation, in fluid conduits 12, 16 and 17. Initially, valve 14 is positioned so that only gas enters Stack 15 by way of fluid conduit 17, and all particulate slurry is returned to Tank 9 by way of fluid conduit 16. When filling of Stack 15 is started, valve 14 is moved to a position where all gas flow is stopped, and a portion of slurry enters stack 15 by fluid conduit 17. Intermittently, valve assembly 14 is switched back to its initial position, and only pressurized gas, e.g., air, is injected to fluid conduit 17 by way of gas supply conduit 13 and valve assembly 14. The length of time that valve assembly 14 is in either position is preferably sufficiently short that liquid will not accumulate in a volume of the cell above the packed particulate bed, and more preferably, voids of the packed particulate bed will mainly contain gas phase before valve 14 is switched back to again to allow slurry to enter Stack 15. Such gas forces liquid out of cells in stack 15 and propels such liquid along fluid return conduit 18. Particulates are retained in cells of Stack 15 by means of retainers at outlets of the cells. Gas and/or liquid exits stack 15 and liquid is returned to Tank 9 preferably at a level above the liquid level in Tank 9 by fluid return conduit 18. Periodically during such filling operation further particulate matter may be added to the mixing tank 9 to maintain a desired particulate concentration in Tank 9. As in FIG. 1, gas, e.g., air from a source of gas, may also be conveyed by conduit 13a to Tank 9 to stir and/or help stir the contents thereof and/or to form a three-phase fluid slurry of liquid (e.g., water), gas (e.g., air) and solid particulates. Part of any slurry in conduit 17 may pass through Stack 15 without passing through cells in such stack and be returned to Tank 9 via conduit 18a.

Figure 3:
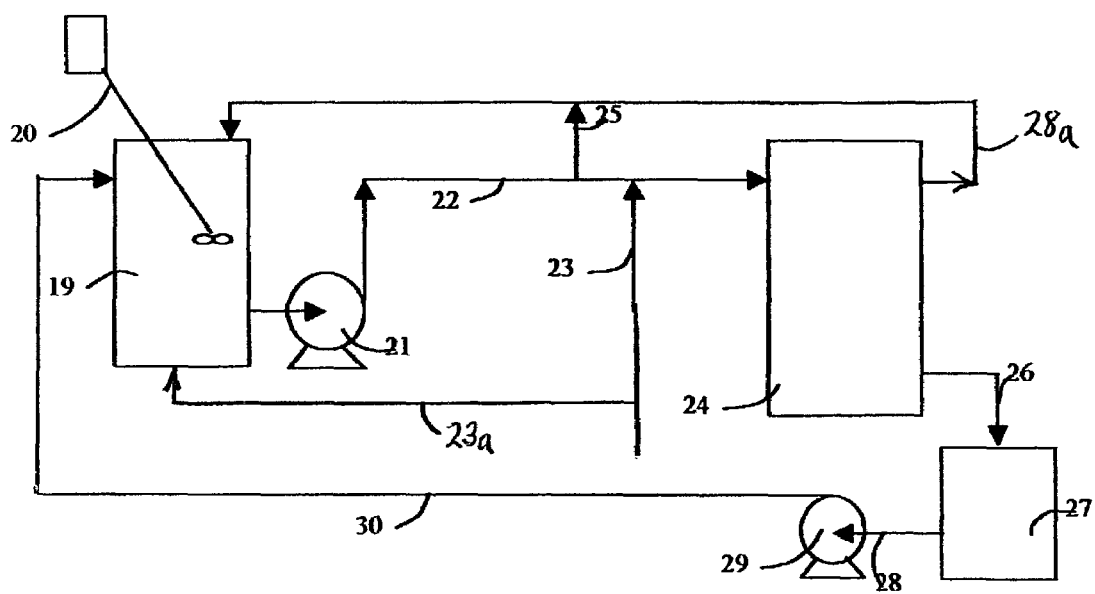
FIG. 3 is a simplified flow diagram schematically illustrating apparatus and method according to another embodiment of this invention.

An alternative preferred embodiment is shown in FIG. 3. This embodiment effects only fluid return from a stack and may be used in combination with either embodiment shown in FIG. 1 or FIG. 2. In this embodiment discharge fluid conduit 26 from a stack is made as short as possible to minimize back pressure in such stack and to allow rapid clearing of liquid from the stack. Tank 27 may be an open tank that allows entrained gas to escape. Fluid, e.g., gas and liquid mixture, or gas or liquid flows by way of fluid conduit 26 to Tank 27 at a level above the fluid level in tank 27. Fluid in tank 27 flows by way of fluid conduit 28, pump assembly 29 and fluid conduit 30 to Tank 19.

Figure 4:
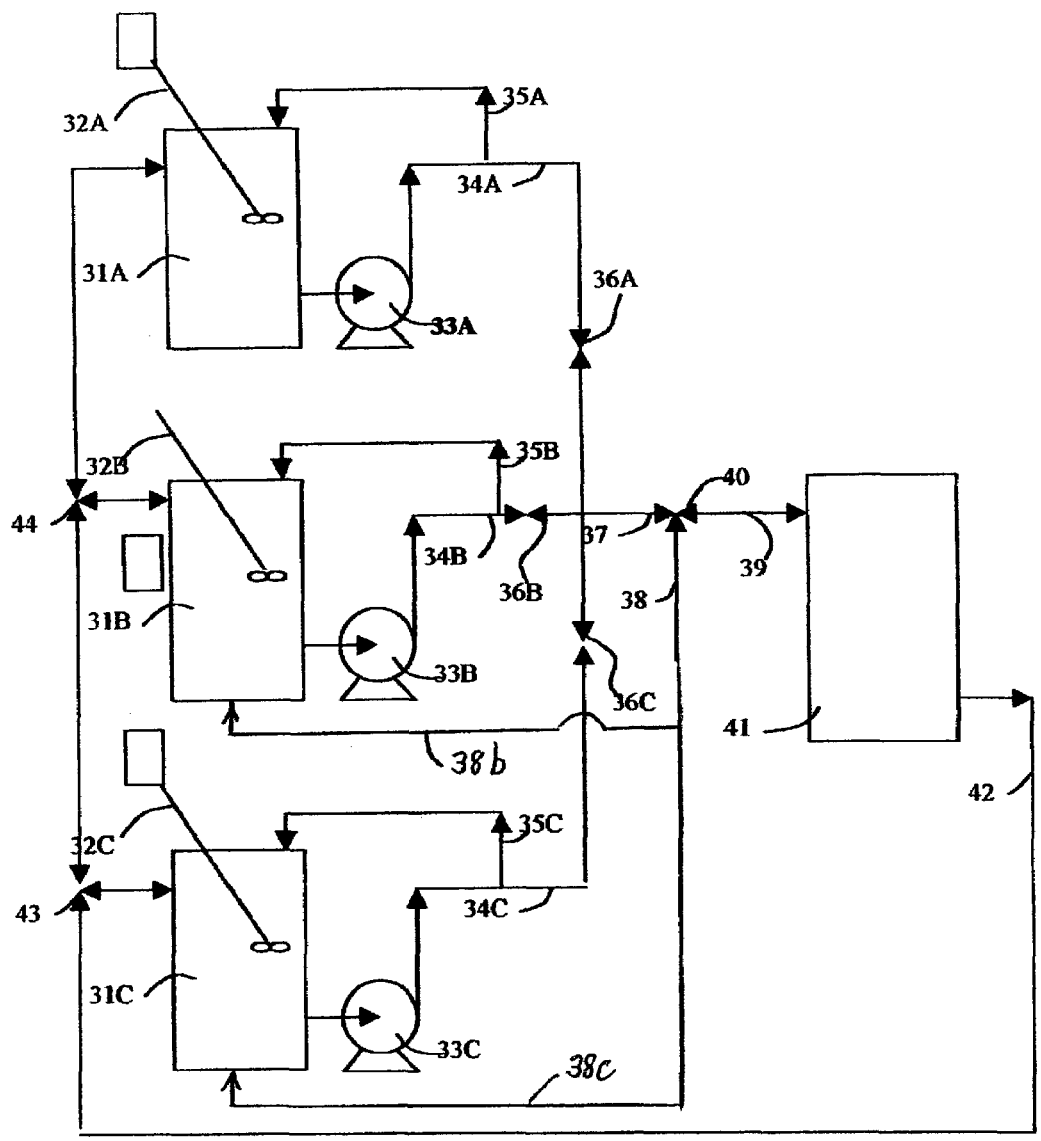
FIG. 4 is a simplified flow diagram schematically illustrating apparatus and method according to another embodiment of this invention.

A simplified flow diagram of another preferred embodiment is shown in FIG. 4. This embodiment provides another method and apparatus, effective to fill different portions of a cell with different particulates. In this schematic three tank/pump units are shown, but it will be understood that any number may be used. Also, any number of tanks may be used with only one pump using a suitable supply manifold or arrangement of fluid conduits and valves. Fluid and particulates are placed in each Tank, 31A, 31B, 31C respectively, and are agitated with mixing mechanisms or suspending assemblies 32A, 32B, 32C respectively and/or gas from a gas source (not shown). Slurry flows via pumps 33A, 33B, 33C respectively and associated fluid conduits 34A, 34B, 34C to valves 36A, 36B, 36C respectively. Valves 36A, 36B, 36C may be positioned to allow flow to the fluid conduit 37 from any one or any combination of tanks at a given time. This arrangement permits discrete or gradual changes in slurry composition, as well as fine tuning of a slurry mixture presented along conduit 37 to valve 40. Valve 40 provides for addition of gas from gas supply conduit 38. Gas addition may be continuous or intermittent as described above for single-tank slurry mixing systems. Slurry and/or gas then passes through fluid delivery conduit 39 to the inlet of Stack 41. As slurry is propelled through Stack 41, particulates are retained in cells being filled, while liquid and/or gas exits Stack 41 at outlet 42. The material from such outlet flows by means of fluid conduit 42 and by way of valving 43 and 44, which may be operated when distinct resins are provided in separate time intervals, to return depleted fluids back to the respective tanks where they originated.

Figure 5:
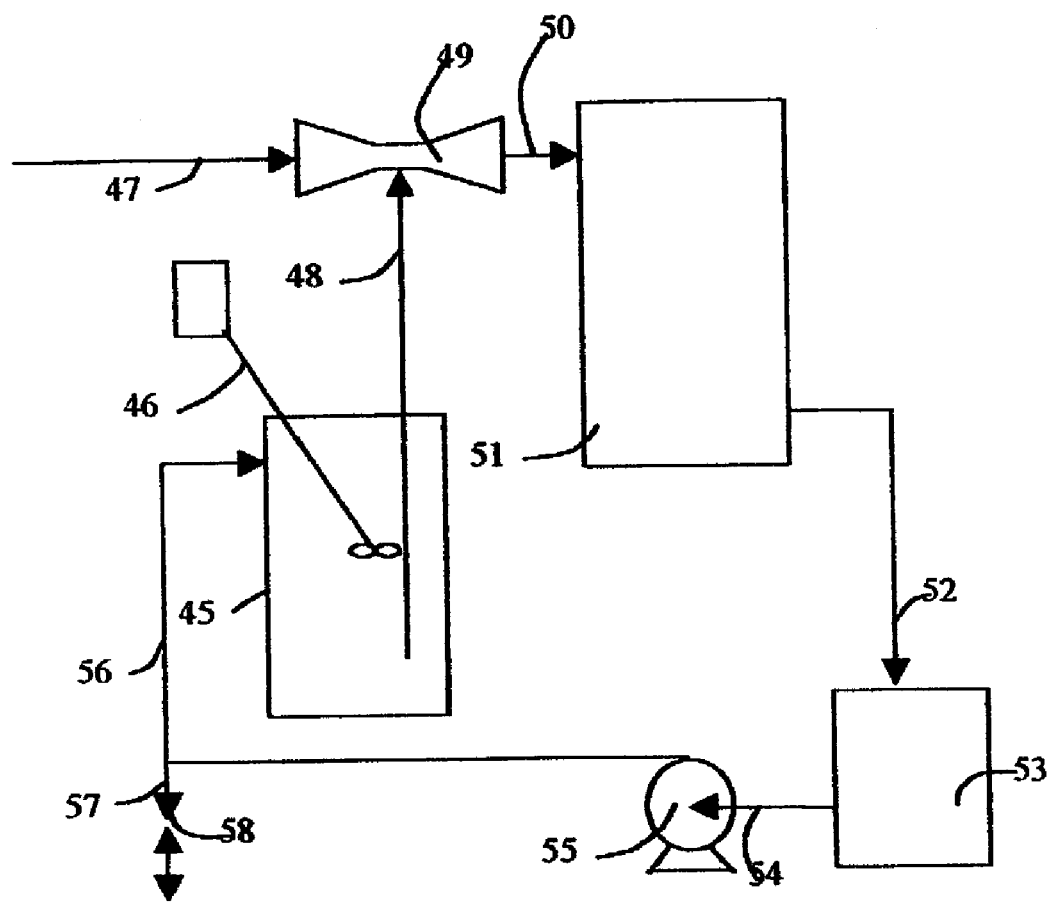
FIG. 5 is a simplified flow diagram schematically illustrating apparatus and method according to another embodiment of this invention.

A simplified schematic of another preferred embodiment is shown in FIG. 5. Tank 45 with a mixing unit or suspending assembly 46 for agitation is used to hold a fluid/resin slurry. Gas is supplied under pressure by fluid conduit 47 from a gas source (not shown) to an eductor 49 that draws slurry from Tank 45 via a fluid conduit 48. Gas and slurry flow through fluid conduit 50 to an inlet of Stack 51 and flow through Stack 51. Particulates from the slurry are captured in and fill cells of Stack 51, while gas and liquid flow by means of fluid conduit 52 to fluid holding tank or sump 53. Fluid then flows by ways of fluid conduit 54, pump 55 and fluid conduit 56 back to mixing tank 45, or may pass by fluid conduit 57 and valve 58 to waste. In an alternative embodiment (not shown) gas and liquid may return by means of a fluid conduit directly back to Tank 45. It should also be noted that, as in the previous embodiment, multiple tanks, each equipped with eductors, may be used to fill Stack 51 with multiple varieties of particulates, e.g., to effect a layered packed bed in cells of Stack 51. Control and sequencing of valves for timing of gas slugs or switching or mixing of different types of particulates may each be controlled by a programmable controller (not shown).

In a preferred embodiment the liquid is water to which is added one or more materials or entities such as a nonionic detergent, glycerin, or another organic or inorganic additive that modifies the air/liquid and/or particulate/liquid interfacial tension or surface energy.

In another preferred embodiment the liquid may consist of or include entities or materials to cause shrinkage of particulates.

In accordance with another embodiment of this invention, the electrodeionization or comparable apparatus comprises compartments or cells defined at least in part by a plurality of spacer elements. These spacer elements may be filled with ion exchange materials and/or with other particulates during assembly of an electrodeionization cell stack, or may be filled with such functional particulates after the stack is assembled. When filling is to be performed after assembly of the stack, the filling operation may be preferably performed by pumping an aqueous mixture, or an air-water slurry of the ion exchange beads or other particulates into the stack utilizing the apparatus and methods of this invention, for example through apertures into the flow cells as taught above. For this purpose the inlet manifold or outlet manifold may be used, or one or more additional apertures may be specially provided to allow such cell filling.

Figure 6:
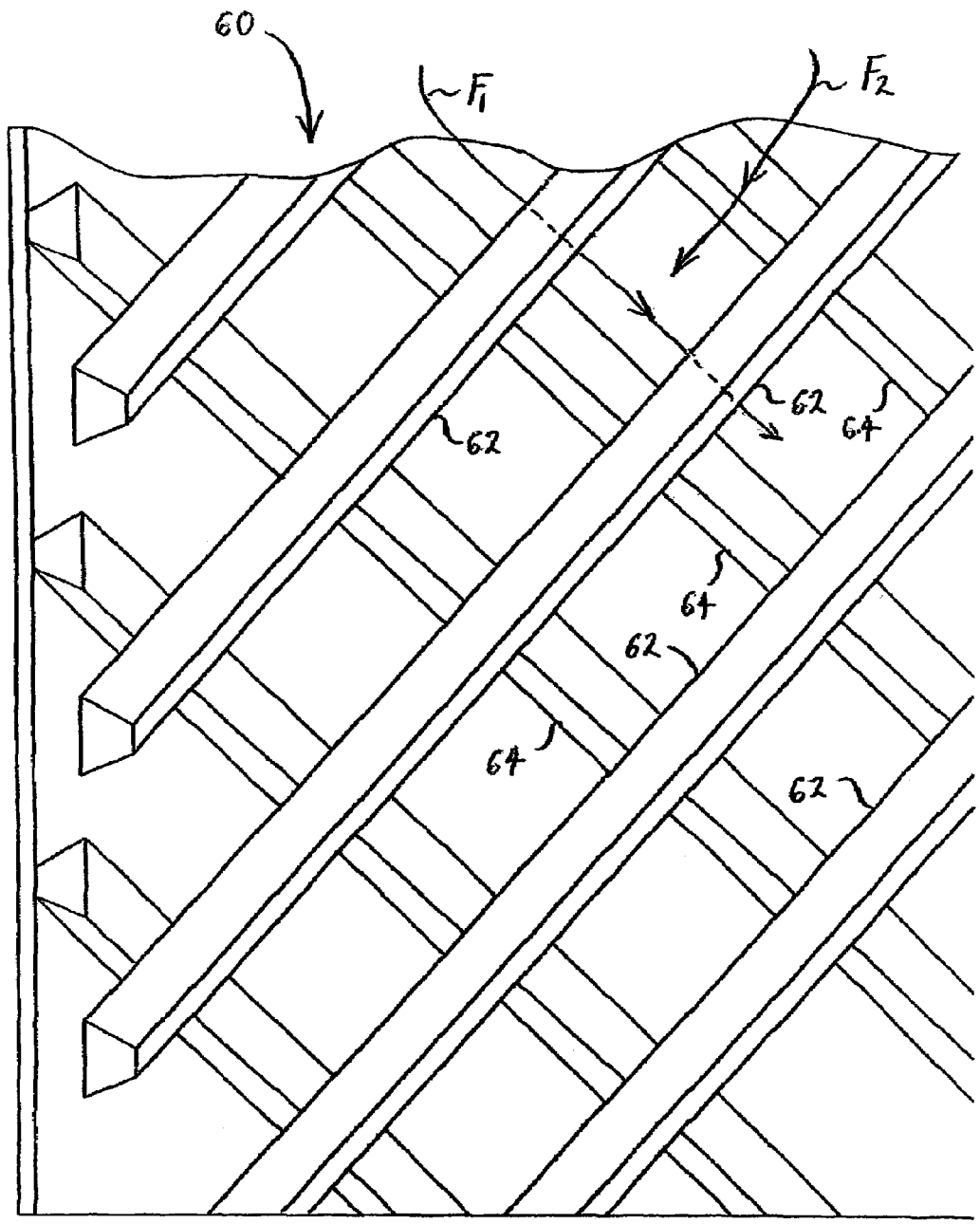
FIG. 6 is a drawing illustrating relevant details of screen strands or fiber structures comprising spacer elements for compartments or cells which are filled in accordance with embodiments of this invention.

FIG. 6 schematically illustrates one type of screen 60 that may be used to construct a filled spacer element in accordance with this embodiment of the invention. Preferably, such screen is a non-woven type screen, such as those made by Nalle Plastics and Applied Extrusion Technology. Cross sections of screen strands used for screen 60 may be of any desired shape, for example, round, oval, rectangular, triangular, trapezoidal, parallelepiped, hexagonal, etc., and strands of one layer may be of the same size and shape or of different size and/or shape. Crossing screen strands may be bonded or fused at many, or even substantially all, intersections. Other types of screens such as woven, expanded, perforated, or corrugated screens may also be used, but are not as preferred for purposes of this invention.

In a preferred embodiment of a screen 60 as shown in FIG. 6, the screen strands comprise two distinct sets of strands, which will be termed warp strands 62 and weft strands 64 by analogy with textile terminology. The warp and weft strands extend transverse to each other. The warp strands 62 along one side of a screen would contact a first membrane, while the weft strands 64 along the other side of the screen would contact a second membrane. Preferably, the strands 62 and 64 are oriented on the bias, that is, they extend diagonally across the nominal direction of the inlet-outlet flow axis through the cell. Screens in accordance with this invention may have more than two layers of crossing strands. Advantageously, the screen element supports the adjacent membranes in a substantially parallel planar orientation to each other, with the strands of the screen defining a certain minimum fixed spacing between the membranes, substantially irrespective of variations which might be introduced by resin swelling or by resin redistribution or maldistribution in the concentrate and/or dilute cells. In addition, the presence of strands running transverse to each other at the respective membrane faces provides both a high open flow cross-section and an effective source of turbulence in the liquid flow. The thickness of a strand may range from below one up to many tens of bead diameters. The open distance between a strand that contacts one membrane and the next membrane, that the strand does not contact, may range from about less than one diameter to many tens of bead diameters. In preferred embodiments of this invention, the screen is molded into perimeter walls of spacer frames. Alternatively, the screen can also be attached to spacer frames by various mechanical means, for example using an adhesive, welding or other suitable bonding process. The screen may also be configured as an independent insert. The screen may also be of woven material, or made from expanded polymer sheets or from corrugated, perforated plastic sheet. In some embodiments, the screen may be ion exchange functionalized throughout or at least along its surfaces. A screen in accordance with this invention may also have the warp strands be of one exchange functionality and the weft strands be of the other functionality and lying in a different contact plane. In another preferred embodiment, the screens are bonded to the respective adjacent membranes.

The bi-layer screen construction shown in FIG. 6, for example, is especially advantageous in this regard. The strand cross-dimension may be on the order of a millimeter, with a relatively larger 2–10 millimeter mesh providing relatively high but guided fluid flow. The nature of the filling flow distribution in two planes and along two directions is schematically indicated by arrows $F_1$ and $F_2$ in FIG. 6, thereby accessing the entire volume of the cell without allowing the beads to settle out or block the flow. Such flow channeling and distribution effects may also enhance normal operation of an electrodeionization apparatus according to the present invention thereby providing more uniform flow distribution and/or allowing cell chamber configurations that would otherwise be susceptible to excessive flow channeling.

It should be noted that any of above described deionization apparatus may, in general, be fabricated as a spiral-wound, disked or planar "stack" having a large plurality of flow cells or compartments (diluting and concentrating channels) defined between spaced-apart sets of membranes, e.g., pairs or triples or more numerous basic units, of membranes, all situated between a set of end electrodes (e.g., top and bottom, left and right, or inside/outside electrodes). Such cells connect to one or more manifolds, having flow passages for passing first and second fluids through the stack. Typically membranes are separated by spacers, and tube-like supply or outlet conduits extend through apertures in multiple layers of cells, providing ports into or out of diluting cells or concentrating cells. This may allow fluid to flow in parallel through many cells to provide a high throughput. Such manifold structure and connecting pipes thus provide or include various inlet, outlet, or other access passages that collectively serve to define flow paths for fluid in various compartments during normal deionization operation. During gas/slurry filling procedures described above, the term "inlet" or the term "outlet" as applied to the stack are to be understood as applying to any of these passages or any of the ports of a stack manifold that are deemed appropriate for filling intended compartments or subsets of compartments within a stack. These may include, but do not necessarily correspond to, fluid inlets and outlets of a stack which are employed for dilute or the concentrating fluid flows in normal deionization operation. They may include additional access ports that provide enhanced flow through particular subsets of compartments, or that provide a more direct flow path, or that otherwise most effectively allow filling of desired compartments in a manner described above. Thus, filling conduits may connect to fill cells from left-to-right, from the center out, top-down, bottom up, middle-down and up, or a different or other special filling path defined in relation to available inlet and outlet ports or manifolds. Preferably, these are chosen or are specially provided so that good filling flow is established through relevant cells to be filled, and so that a retainer catches particulates while passing fluid components of a fill flow to an outlet. Since flow of slurry need only be established in discontinuous or gas-modulated bursts through passages from which ponded liquid is scavenged by flow of gas, such transport process effectively packs retained particulates in a well formed bed.

An electrodeionization and related apparatus of the invention includes cells having beds of ion exchange particulates in its compartments that are well packed and of enhanced uniformity. Enhanced flow filling achieved with air-modulated slurry delivery can advantageously be applied to fill compartments with mixtures of particulates having several different sizes and/or densities that may each independently differ. Particulates may be different types of resin (anion/cation) or of the same type, and size and/or density differences may cover a considerable range while still achieving a substantially non-settling transport and delivery as a well packed bed in a cell. Thus, a novel apparatus in accordance with this invention includes electrodeionization and related apparatus having cells filled with two or more different particulates in a uniform or substantially uniform bed.

In accordance with filling methods of this invention, gas can be introduced during a filling procedure into an outlet end of a stack or cells after slurry flow has been stopped. Such reverse-direction gas flow-through may be done while cells still contain a relatively large residue of carrier liquid from the slurry. Alternatively, reverse-direction gas may be applied after one or more rounds of gas purging slugs have been introduced at an inlet (as described above) in the filling direction, and most residual liquid has already been displaced along the direction of filling flow. In this embodiment, back-flow of gas serves to evacuate liquid pockets that may have remained in compartments, or to disperse or remove ponded liquid that may have survived an initial forward-flow gas purge. Such counter-flow gas purge also serves intermittently to shake slightly and better compact a deposited resin bed.

It will be apparent to those skilled in the art that the invention may be practiced with variations and modifications. Thus, while several embodiments are described above having depleted liquid from a stack outlet returned to a mixing tank, such carrier return arrangement is especially advantageous when carrier liquid is itself special—e.g., is deionized water, or is a specially-compounded carrier fluid such as a salt or polyol solution or surface-treatment carrier fluid. It is also useful when returned carrier carries some residual load of particulates which are to be efficiently used. However, flow from a stack outlet may also be sent to a drain, or when a time-varying mixture of particulates is used, may be sent to a reclamation tank where remaining particulates may be allowed to settle, and be reclaimed and separated into their component types before re-use.

While the invention has been described in terms of specific examples and preferred embodiments, claims appended hereto are intended to encompass all other embodiments which fall within the spirit of the invention as described herein.

We claim:

1. Filling apparatus for at least partially filling one or more cells of an electrodialysis, electrodeionization, electrodiaresis or a related stack assembly with particulates through one or more conduits communicating with such cell(s), each cell having one or more inlets communicating with one or more inlets into said stack and one or more outlets communicating with one or more outlets from said stack, said filling apparatus comprising:
    (a) one or more suspension-creating assemblies effective to provide one or more suspensions of fluids and solid particulates without substantial loss of suspension of such particulates in such fluids;
    (b) one or more suspension-moving assemblies comprising one or more suspension-delivery conduits operative to move said suspension(s) from said one or more suspending-creating assemblies along said suspension-delivery conduit(s) to said stack whereby particulates of said suspension(s) are substantially maintained in suspension while flowing in said suspension-delivery conduit(s) and said suspension(s) are thereby delivered to said stack substantially without loss of suspension for deposit of said particulates in cells of said stack; and,
    (c) a gas source connected to introduce gas into such suspension(s), or into said suspension-delivery conduits, or into both, whereby such suspension(s) are passed into and through said cell(s) such that particulates are retained in said cell(s) and liquid is forced out of said cell(s).

2. Apparatus according to claim 1 wherein said fluid consists essentially of a mixture of liquid and gas.

3. Apparatus according to claim 1 wherein said fluid consists essentially of water.

4. Apparatus according to claim 1 wherein said fluid consists essentially of water and one or more entities selected from the group consisting of:
    (i) entities which cause particulate shrinkage;
    (ii) entities which modify gas/liquid interfacial tension or surface energy; and,
    (iii) entities which modify particulate/liquid interfacial tension or surface energy.

5. Apparatus according to claim 1 wherein said particulates consist essentially of ion exchange particulates.

6. Apparatus according to claim 1 wherein said gas source comprises a source of air.

7. Apparatus according to claim 1 wherein said gas source is capable of introducing gas at controlled variable rates.

8. Apparatus according to claim 1 wherein said gas source is capable of introducing gas intermittently.

9. Apparatus according to claim 1 further comprising a control system operative to:
    (iv) flow said suspension(s);
    (v) stop flow of said suspension(s) and introduce sufficient gas from said gas source to drive liquid from said cell(s);
    (vi) iteratively to repeat steps (i) and (ii).

10. Apparatus according to claim 1 wherein said one or more of said suspension-creating assemblies provides two or more different suspensions selected from the group consisting of:
- (vi) a suspension consisting essentially of cation exchange particulates;
- (vii) a suspension consisting essentially of anion exchange particulates;
- (viii) a suspension consisting essentially of cation exchange particulates and anion exchange particulates;
- (ix) a suspension consisting essentially of two groups of particulates, a first group of substantially uniform size particulates having a first mean particulate size and a second group of substantially uniform size particulates having a second mean particulate size which is different from said first mean particulate size; and,
- (x) a suspension consisting essentially of two groups of particulates, a first group of substantially uniform density particulates having a first mean particulate density and a second group of substantially uniform density particulates having a second mean particulate density which is different from said first mean particulate density.

11. Apparatus according to claim 10 further comprising a control assembly effective to alternatively deliver to said stack one or another of said different suspensions to form particulate layers in cells of said stack, said layers differing with respect to ion exchange functionality, mean particulate size, and/or mean particulate density.

12. Apparatus according to claim 1 wherein said electrodialysis, electrodeionization, electrodiaresis or related stack assembly comprises spiral wound membranes.

13. Apparatus according to claim 1 wherein said one or more suspension-moving assemblies are operative to deposit some of said particulates in said cell(s) and to return some of said particulates to said one or more suspension-creating assemblies.

14. Apparatus according to claim 1 wherein substantially all of said particulates have substantially the same settling velocity.

15. A process for at least partially filling one or more cells of a planar, dished or spiral wound electrodialysis, electrodeionization, electrodiaresis or related stack assembly with particulates through a suspension-delivery conduit system communicating with said stack assembly, said process comprising the steps of:
- (a) creating one or more suspensions of fluid and solid particulates, and providing sufficient agitation to said suspensions substantially to maintain said particulates in suspension;
- (b) flowing said suspension(s) through said suspension-delivery conduit system to said cell(s) of said stack assembly while continuing to maintain said particulates substantially in suspension;
- (c) introducing gas into said suspension-delivery conduit system during flow of said suspension(s) through said conduit system, intermittently while there is no flow of suspension(s) through said conduit system, or both; and,
- (d) flowing said suspension(s) from said suspension-delivery conduit system into said cell(s), depositing said particulates in said cell(s), and removing liquid from said cell(s).

16. A process according to claim 15 wherein said fluid consists essentially of a mixture of liquid and gas.

17. A process according to claim 15 wherein said fluid consists essentially of water.

18. A process according to claim 15 wherein said suspension-delivery conduit system includes a gravity head.

19. A process according to claim 15 wherein said fluid consists essentially of water and one or more entities selected from the group consisting of:
- (i) entities which cause particulate shrinkage;
- (ii) entities which modify gas/liquid interfacial tension or surface energy; and,
- (iii) entities which modify particulate/liquid interfacial tension or surface energy.

20. A process according to claim 15 wherein said particulates consist essentially of ion exchange material.

21. A process according to claim 15 wherein said gas consists essentially of air.

22. A process according to claim 15 further comprising the step of using a control system to:
- (i) flow said suspension(s) to said cell(s);
- (ii) periodically stopping flow of said suspension(s) and introducing sufficient gas from a gas source to drive liquid from said cell(s);
- (iii) iteratively repeating steps (i) and (ii).

23. A process according to claim 15 wherein said suspensions consist of two or more different suspensions selected from the group consisting of:
- (i) a suspension consisting essentially of cation exchange particulates;
- (ii) a suspension consisting essentially of anion exchange particulates;
- (iii) a suspension consisting essentially of cation exchange particulates and anion exchange particulates;
- (iv) a suspension consisting essentially of two groups of particulates, a first group of substantially uniform size particulates having a first mean particulate size and a second group of substantially uniform size particulates having a second mean particulate size which is different from said first mean particulate size;
- (v) a suspension consisting essentially of two groups of particulates, a first group of substantially uniform density particulates having a first mean particulate density and a second group of substantially uniform density particulates having a second mean particulate density which is different from said first mean particulate density; and,
- (vi) a suspension consisting essentially of two groups of particulates, a first group of substantially uniform particulates having a first mean terminal settling velocity and a second group of substantially uniform particulates having a second mean terminal settling velocity which is different from said first mean terminal settling velocity.

24. A process according to claim 23 further comprising the step of alternatively delivering to said stack one or another of said different suspensions to form particulate layers in cells of said stack, said layers differing with respect to ion exchange functionality, mean particle size, mean particulate density and/or mean terminal settling velocity.

25. A process according to claim 15 further comprising the steps of depositing some of said particulates in said one or more cells and returning some of said particulates to step (a) of the process.

26. A process according to claim 15 wherein substantially all said particulates have substantially the same settling velocity.

27. Apparatus for at least partially filling one or more cells of an electrodialysis, electrodeionization or electrodialysis stack with ion exchange particulates through a conduit communicating with the stack, the stack comprising a plurality of cells and each cell being defined by opposed membranes and a spacer separating the membranes, each cell further having an inlet and an outlet, communicating with an inlet of said stack and an outlet of said stack, respectively, wherein the apparatus includes a mixing assembly effective to provide a mixture of liquid and particulates, the particulates being suspended substantially without settling in the liquid, a fluid moving assembly operative to move the mixture from the mixing assembly along a conduit to the stack, and providing flow at a level sufficient to substantially prevent segregation of the particulates as they move in the conduit whereby the mixture is delivered to the stack substantially without settling or segregation, flowing through the stack and depositing said particulates in said cells, and a gas introducer connected to inject gas and form a gas-modulated flow of said mixture, such that liquid is propelled through the stack while depositing particulates retained in said cells, wherein the gas introduced scavenges ponded liquid within the cells of said stack such that the particulates deposit as a well-defined, uniform bed of packing.

28. A method for at least partially filling one or more cells of an electrodialysis, electrodeionization or electrodialysis stack with ion exchange particulates, the stack comprising an inlet, and outlet and a plurality of cells, each cell being defined by opposed membranes and a spacer separating the membranes, each cell further having an inlet and an outlet communicating with the inlet of said stack and the outlet of said stack, respectively, wherein the method includes the steps of providing a mixture of liquid and particulates, the particulates being suspended substantially without settling in the liquid, flowing the mixture into the stack at a rate of flow sufficient to substantially prevent segregation of the particulates such that the mixture is delivered to the stack substantially without settling or segregation, flowing through the stack and depositing said particulates in said cells, and injecting gas to form a gas-modulated flow of said mixture, such that liquid is propelled through the stack and particulates are deposited in said cells as a well-defined, uniform bed of packing.

29. A method of filling at least some compartments of an ion exchange apparatus comprising a multi-compartment stack with a desired ion exchange material, such method comprising the steps of providing a flow of slurry including a minor proportion of the desired ion exchange material entrained therein to the stack, said flow passing into and through the compartments of the stack such that ion exchange material entrained in such slurry is retained in at least some of the compartments to form a packed bed in such compartments, and providing slugs of gas under pressure effective to scavenge ponded liquid from the compartments, such that the flow of slurry proceeds unimpeded by ponded liquid to deposit the entrained ion exchange material as a packed bed in such compartments.

30. Ion exchange apparatus, including an electrodialysis, electrodeionization or electrodialysis stack and particulate ion exchange material, wherein the stack has an inlet, an outlet and a plurality of cells, each cell being defined by opposed membranes and a spacer separating the opposed membranes, each cell further having an inlet and an outlet communicating with the inlet of said stack and the outlet of said stack whereby during a cell-filling operation a suspension of particulate ion exchange material in a fluid may be passed through the cells, at least some of said cells being filled cells filled with said particulate ion exchange material for conducting ions to or from an adjacent cell, wherein such filled cells include a retainer effective for catching particulates presented in a flow of the suspension through said cells thereby retaining said particulates in each of said filled cells as a homogeneously packed bed; and further wherein gas is fed to the stack during the cell-filling operation.

31. Apparatus for at least partially filling one or more cells of an electrodialysis, electrodeionization and/or electrodiaresis stack with particulates through first conduit means communicating with said stack, each such cell defined by two membranes and walls of a spacer, each such cell having inlet means and outlet means in communication respectively with inlet means and outlet means of said stack, wherein said apparatus includes, but is not limited to:

liquid holding means equipped with agitating means effective to agitate mixtures of liquid and such particulates so that said particulates remain substantially suspended in said liquid and do not settle substantially, pumping means having inlet means in communication with said liquid holding means through second conduit means, said pumping means providing flow sufficient to prevent substantial segregation of said particulates in conduit means, said liquid holding means communicating seriatim with said second conduit means, said pumping means, said first conduit means, said inlet means of said stack, said inlet means of said cell, said cell, said outlet means of said cell, said outlet means of said stack, third fluid conduit means communicating with said first conduit means and/or said second conduit means enabling introduction of gas to said first conduit means and/or said second conduit means.

32. A process for at least partially filling one or more cells of an electrodialysis, electrodeionization and/or electrodiaresis stack with particulates through first conduit means communicating with said stack, said process including but not limited to:

providing an electrodialysis, electrodeionization and/or electrodiaresis stack comprising one or more cells, each such cell defined by two membranes and walls of a spacer, each such cell having inlet means and outlet means in communication respectively with inlet means and outlet means of said stack, providing liquid holding means equipped with agitating means effective to agitate mixtures of liquid and such particulates so that such particulates remain substantially suspended in such liquid and do not settle substantially, providing pumping means having inlet means in communication with said liquid holding means through second conduit means, said pumping means effective to provide flow sufficient to prevent substantial segregation of said particulates in conduit means, also providing means communicating seriatim from with said liquid holding means through second conduit means, said pumping means, said first conduit means, said inlet means of said stack, said inlet means of said cell, said cell, said outlet means of said cell, to said outlet means of said stack, further providing third fluid conduit means communicating with said first conduit means and/or said second conduit means enabling introduction of gas to said first conduit means and/or said second conduit means, said process also comprising forming one or more mixtures of liquid and such particulates in said liquid holding means, passing at least part of said one or more mixtures seriatim from said liquid holding means through second conduit means, said pumping means, said first conduit means, said inlet means of said stack, and said inlet means of said cell, said process further comprising introducing gas through said third fluid conduit means into said first and/or said second conduit means in predetermined amounts according to a predetermined program.

* * * * *